US008543521B2

(12) United States Patent
Yang et al.

(10) Patent No.: US 8,543,521 B2
(45) Date of Patent: Sep. 24, 2013

(54) SUPERVISED RE-RANKING FOR VISUAL SEARCH

(75) Inventors: Linjun Yang, Beijing (CN); Xian-Sheng Hua, Bellevue, WA (US)

(73) Assignee: Microsoft Corporation, Remond, WA (US)

( * ) Notice: Subject to any disclaimer, the term of this patent is extended or adjusted under 35 U.S.C. 154(b) by 405 days.

(21) Appl. No.: 13/076,350

(22) Filed: Mar. 30, 2011

(65) Prior Publication Data

US 2012/0254076 A1    Oct. 4, 2012

(51) Int. Cl.
*G06F 15/18*    (2006.01)

(52) U.S. Cl.
USPC .......................................................... 706/12

(58) Field of Classification Search
None
See application file for complete search history.

(56) References Cited

U.S. PATENT DOCUMENTS

| | | | |
|---|---|---|---|
| 5,893,095 A | 4/1999 | Jain et al. | |
| 7,313,269 B2 | 12/2007 | Xie et al. | |
| 7,412,694 B2 * | 8/2008 | Fink et al. | 717/128 |
| 8,180,766 B2 * | 5/2012 | Yang et al. | 707/723 |
| 8,346,767 B2 * | 1/2013 | Yang et al. | 707/728 |
| 8,392,430 B2 * | 3/2013 | Hua et al. | 707/748 |
| 8,406,573 B2 * | 3/2013 | Wang et al. | 382/305 |
| 8,412,694 B2 * | 4/2013 | Wang et al. | 707/706 |
| 8,452,794 B2 * | 5/2013 | Yang et al. | 707/767 |
| 2006/0165354 A1 | 7/2006 | Kim | |
| 2007/0203942 A1 | 8/2007 | Hua et al. | |
| 2008/0052312 A1 | 2/2008 | Tang et al. | |
| 2009/0063455 A1 | 3/2009 | Li et al. | |
| 2009/0154795 A1 | 6/2009 | Tan et al. | |
| 2009/0292685 A1 | 11/2009 | Liu et al. | |
| 2009/0313239 A1 | 12/2009 | Wen et al. | |
| 2010/0082614 A1 | 4/2010 | Yang et al. | |
| 2010/0205202 A1 | 8/2010 | Yang et al. | |

OTHER PUBLICATIONS

Bing.com, retrieved on Nov. 26, 2010 at <<http://images.bing.com/>>, 1 page.
Cao et al., "Learning to Rank: From Pairwise Approach to Listwise Approach," 2007, retrieved at <<http://research.microsoft.com/pubs/70428/tr-2007-40.pdf>>, 9 pages.
Carbonell et al., "Translingual Information Retreval: A Comparative Evlauaton" In Poceedings of the Ffteenth International Joint Conference on Artificial Intelligence, 1997, 7 pages.
Chang et al., "High-Level Feature Extraction and Interactive Video Search," Columbia University/VIREO-CityU/IRITTRECVID2008, Oct. 26, 2008, retrieved at <<http://vireo.cs.cityu.edu.hk/papers/trec08_cucityu.pdf, 17 pages.

(Continued)

*Primary Examiner* — Michael B Holmes
(74) *Attorney, Agent, or Firm* — Lee & Hayes, PLLC

(57) ABSTRACT

Supervised re-ranking for visual search may include re-ordering images that are returned in response to a text-based image search by exploiting visual information included in the images. In one example, supervised re-ranking for visual search may include receiving a textual query, obtaining an initial ranking result including a plurality of images corresponding to the textual query, and representing the textual query by a visual context of the plurality of images. A query-independent re-ranking model may be trained based on visual re-ranking features of the plurality of images of the textual query in accordance with a supervised training algorithm.

20 Claims, 5 Drawing Sheets

(56) References Cited

OTHER PUBLICATIONS

Chapelle et al., "Large Margin Optimization of Ranking Measures," NIPS 2007 Workshop on Machine Learning for Web Search, 2007, retrieved at <<http://research.microsoft.conn/en-us/um/people/denzho/nips/papers/ranking.pdf>>, 8 pages.

Cremean, "Stability Analysis of Interconnected Nonlinear systems under Matrix Feedback," Proceedings of the 42nd IEEE Conference on Decision and Control, Maui, Hawaii, USA, Dec. 2003, vol. 3, pp. 3078-3083.

Cui et al., "Real Time Google and Live Image Search Re-Ranking," MM'08, Oct. 26-31, 2008, Vancouver, BC, Canada, retrieved at <<http://www.stanford.edu/~jycui/data/Jingyu_Cui_MM08.pdf>>, 4 pages.

Fergus et al., "A Visual Category Filter for Google Images," Computer Vision—ECCV, 2004, Lecture Notes in Computer Science, 2004, vol. 3021/2004, 14 pages.

Google images, retrieved on Nov. 26, 2010 at <<http://images.google.com/>>, 1 page.

Hauptmann et al., "How many High-level Concepts will fill the Semantic Gap in News Video Retrieval," CIVR 2007 ACM International Conference on Image and Video Retrieval, Jul. 9-11, 2007, retrieved at <<http://www.informedia.cs.cmu.edu/documents/civr07ontology_v4.pdf>>, 8 pages.

Herbrich et al., "Large Margin Rank Boundaries for Ordinal Regression" in Smola et al., "Advances in Large Margin Classifiers,"MIT Press, Cambridge, MA, (c) 2000, 22 pages.

Hoi et al., "A Multimodal and Multilevel Ranking Scheme for Large-Scale Video Retrieval," IEEE Transactions on Multimedia, 2008, pp. 1-13.

Hsu et al., "Reranking Metholds for Visual Search," IEEE 2007, 9 pages.

Hsu et al., "Video Search Reranking through Random Walk over Document-level Context Graph," MM'07, Sep. 23-28, 2007, Augsburg, Bavaria, Germany, retrieved at <<http://www.ee.columbia.edu/~lyndon/pubs/acmmm2007- rerank.pdf>>, 10 pages.

Hsu et al., "Video Search Reranking via Information Bottleneck Principle," MM'06, Oct. 23-27, 2006, Santa Barbara CA, USA, retrieved at <<http://www.ee.columbia.edu/~lyndon/pubs/acmmm2006-rerank.pdf, 10 pages.

Huang et al "Obect Identification in a Bayesian Context," In Poceedings of the Fifteenth Internaional Joint Conference on Artificial Intelligence, 1997, 8 pages.

Jarvelin et al., "IR Evaluation Methods for Retrieving Highly Relevant Documents," Proceedings of the 23rd Annual International ACM SIGIR Conference on research and Development in Information Retrieval, New York, NY, 2000, retrieved at <<http://www.info.uta.fi/tutkimus/fire/archive/KJJKSIGIR00.pdf>>, pp. #41-48.

Jing et al., "Visualrank: Applying Pagerank to Large-Scale Image Search, " IEEE Transactions on Pattern Analysis and Machine Intelligence, Vol. 30, No. 11, Nov. 2008, retrieved at <<http://ieeexplore.ieee.org/stamp/stamp.jsp?tp=&arnumber=4522561>> pp.#1877-1890.

Joachims, "Optimizing Search Engines using Clickthrough Data," SIGKDD 02 Edmonton, Alberta, Canada, 2002, retrieved from <<http://www.cs.cornell.edu/People/tj/publications/joachims_02c.pdf>>, 10 pages.

Joachims, "Training Linear SVMs in Lenear Time," KDD'06, Aug. 20-23, 2006, Philadelphia, Pennsylvania, USA, retrieved at <<http://www.cs.cornell.edu/People/tj/publications/joachims_06a.pdf>>, 10 pages.

Kendall, "A new measure of rank correlation," Biometrika, vol. No. 30, No. 1/2 (Jun. 1938), retrieved on Nov. 26, 2010 at <<http://www.jstor.org/pss/2332226>>, 3 pages.

Kennedy et al., "A Reranking Approach for Context-based Concept Fusion in Video Indexing and Retrieval," CIVR'07, Jul. 9-11, 2007, Amsterdam, The Netherlands, 8 pages.

Korn et al., "Influence Sets Based on Reverse Nearest Neighbor Queries," Proceedings of the 2000 ACM SIGMOD international conference on Management of data, copyright 2000, retrieved at <<http://graphics.stanford.edu/courses/ cs468-06-fall/Papers/19%20reverse%202.pdf>>, 12 pages.

Krapac et al., "Improving web image search results using query-relative classifiers," IEEE Conference on Computer Vision and Pattern Recognition (CVRP), Jun. 13-18, 2010, San Francisico, CA, retrieved at <<http://yoshi.cs.ucla.edu/upload/CVPR10/data/papers/1873.pdf>>, 8 pages.

Liu et al., "Learning to Video Seach Rerank via Pseudo Preference Feedback," IEEE, copyrght 2008, rertrieved at <<http://ieeexplore.ieee.org/stamp/stamp.jsp?tp=8(arnumber=4607430>>, 4 pages.

Liu et al., "Video Search Re-Ranking via Multi-Graph Propagation," Sep. 23-28, 2007, Augsberg, Bavaria, Germany, ACM 2007, pp. 208-217.

Mei et al., "MSRA-USTC-SJTU at TRECVID 2007: High-Level Feature Extraction and Search," MSRA at TRECVID 2007, 12 pages.

Natsev et al., "Semantic Concept-based Query Expansion and Re-Ranking for Multimedia Retrieval," MM'07, Sep. 23-28, 2007, Augsburg, Bavaria, Germany, retrieved at <<http://www.ee.columbia.edu/~xlx/research/papers/ACM-MM07-SemanticRetrieval.pdf>>, 10 pages.

Philbin,et al., "Object Retrieval with Large Vocabularies and Fast Spatial Matching," IEEE Conference on Computer Vision and Pattern Recognition, Jun. 17-22, 2007, Minneapolis, MN, USA, retrieved at <<http://www.robots.ox.ac.uk/~vgg/publications/papers/philbin07.pdf>>, 8 pages.

Platt, "Fast Training of Supprot Vector Machines," Published in Advances in kernel methods, copyright 1999, retrieved at <<http://research.microsoft.com/pubs/68391/smo-book.pdf>>, 25 pages.

Robertson et al., "Simple, proven approaches to text retrieval," In Cambridge University Computer Laboratory Technical Report TR356, Dec. 1994, pp. 1-8.

Robertson et al., "The TREC-9 Filtering Track Final Report," National Institute of Standards & Technology, Special Publication, 2001, retrieved at <<http://comminfo.rutgers.edu/~muresan/IR/TREC/ Proceedings/t9_proceedings/papers/filtering_new.pdf>>, 12 pages.

Schroff et al., "Harvesting Image Databases from the Web," IEEE copyright 2007, retrieved at <<http://ieeexplore.ieee.org/stamp/stamp.jsp?tp=&arnumber=4409099>>, 8 pages.

Smeaton et al., "Evaluation Compaigns and TRECVid," MIR'06, Oct. 26-27, 2006, Santa Barbara, USA, ACM 2006, 10 pages.

Smola, "pr LOQO," Oct. 1997, retrieved from <<http://www.kernel-machines.org/code/prloqo.tar.gz>>, 12 pages.

Snoek et al., "Concept-Based Video Retrieval," Foundations and Trends in Information Retrieval, vol. 2, No. 4 (2008) 215-322, copyright 2009, retrieved at <<http://www.science.uva.nl/research/publications/2009/SnoekFTIR2009/snoek-concept-based-video-retrieval-fntir.pdf>>, 110 pages.

Snoek et al., "The Challenge Problem for Automated Detection of 101 Semantic Concepts in Multimedia," MM'06, Oct. 23-27, 2006, Santa Barbara, California, USA, Copyright 2006, retrieved at <<http://www.science.uva.nl/research/mediamill/pub/snoek-challenge-acm2006.pdf>>, 10 pages.

Stern et al, "Bayesian Pattern Ranking for Move Prediction in the Game of Go," Proceedings of the 23rd International Conference on Machine Learning, PA, 2006, 8 pages.

"TREC Video Retrieval Evaluation," retrieved on Jun. 23, 2008 from <<http://www-nlpir.nist.gov/projects/trecvidi>>, 2 pages.

"Trec-10," retrieved from <<http://trec.nist.gov/pubs/trec10/appendices/measures.pdf>> available at least as early as Sep. 30, 2009, 10 pages.

van Leuken et al., "Visual Diversification of Image Search Results," International World Wide Web Conference Committee, Apr. 20-24, 2009, Madrid, Spain, retrieved at <<http://www2009.eprints.org/35/1/p341.pdf>>, pp. #341-350.

Vasconcelos et al., "A Bayesian Video Modeling Framework for Shot Segmentation and Content Characterization," IEEE1997, pp. 59-66, 8 pages.

Wang et al., "MSRA-MM: Bridging Research and Industrial Societies for Multimedia Information Retrieval," Research Asia, Tech. Report, 2009, retrieved at <<http://research.microsoft.com/pubs/79942/MSRAMM.pdf, pp. #1-14.

Yahoo! Image Search, retrieved on Nov. 26, 2010, at <<http://images.yahoo.com/>>, 2 pages.

Yan et al., "Co-retrieval: a boosted reranking approach for video retrieval," IEEE Proc. Vis. Image Signal Processing, vol. 152, vol. 6. Dec. 2005, pp. 888-895.

Yan et al., "Multimedia Search with Pseudo-Relevance Feedback," International Conference on Image and Video Retrieval, Urbana, IL, Jul. 24-25, 2003, retrieved at <<http://www.informedia.cs.cmu.edu/documents/CIVR03-RelFeedback_Final.pdf>>, 10 pages.

Yang et al., "Distance Metric Learning: A Comprehensive Survey," Department of Computer Science and Engineering, Michigan University, May 19, 2006, pp. 1-51.

Yang et al., "Video Search Reranking via Online Ordinal Reranking," Multimedia and Expo, 2008 IEEE International Conference on multimedia and expo ICME 2008 proceedings, Aug. 2008, retrieved at <<http://mpac.ee.ntu.edu.tw/~yihsuan/pub/ICME08_rrk.pdf>>, 4 pages.

Yates, "Modern Information Retrieval," ACM Press, Copyright 1999, retrieved from <<http://zaphod.mindlab.umd.edu/docSeminar/pdfs/10.1.1.27.7690.pdf>>, 38 pages.

Yue et al., "Predicting Diverse Subsets using Structural SVMs," Proceedings of the 25th International Conference on Machine Learning, Helsinki, Finland, 2008, retrieved at <<http://www.cs.cornell.edu/People/tj/publications/yue_joachims_08a.pdf>>, 8 pages.

Zhang et al., "Building Pair-Wise Visual Word Tree for Efficient Image Re-Ranking," 2010, retrieved at <<http://www.jdl.ac.cn/doc/2010/ICASSP_Building%20Pair-Wise%20Visual%20Word%20Tree%20for%20Efficient%20Image%20Re-ranking.pdf>>, 4 pages.

Zhou et al., "Learning with Local and Global Consistency," Advances in Neural Information Processing Systems 16, 2004, 8 pages.

Zhu et al., "Semi-Supervised Learning Using Gaussian Fields and Harmonic Functions," Proceedings of the 20th International Conference on machine Learning. ICML 2003, Washington DC, 2003. 8 pages.

* cited by examiner

SUPERVISED RE-RANKING FOR VISUAL SEARCH

BACKGROUND

Existing image search engines index images based on textual information associated with the images, such as surrounding text, anchor text, uniform resource locators (URLs), etc. A user who wants to perform an image search may submit one or more keywords to an image search engine, which may compare the keyword(s) with the textual information of the images and return a search result including a certain number of images to the user. An accuracy of the search result depends on an accuracy of the textual information representing the images and an availability of the textual information of the images. If the textual information is inaccurate or insufficient, the search engine may return irrelevant images in the search result. Furthermore, the search result may include incorrect rankings of the images, with some irrelevant images being placed in high rank positions while certain relevant images being placed in low rank positions.

SUMMARY

This summary introduces simplified concepts of supervised re-ranking for visual search, which is further described below in the Detailed Description. This summary is not intended to identify essential features of the claimed subject matter, nor is it intended for use in limiting the scope of the claimed subject matter.

This application describes example embodiments of supervised re-ranking for visual search. In one embodiment, a textual query may be received and an initial ranking result corresponding to the textual query may be obtained. In some embodiments, the initial ranking result may include a plurality of images corresponding to the textual query. The textual query may be represented by a visual context of the plurality of images. The visual context of the plurality of images facilitates determining visual re-ranking features of the plurality of images which may include, for example, prior re-ranking features (e.g., initial rankings of the plurality of images), contextual re-ranking features (e.g., information of respective neighborhood structures of the plurality of images) and/or pseudo relevance feedback re-ranking features (e.g., features based on a predetermined number of top-ranked images) of the plurality of images. A query-independent re-ranking model may be trained based on the visual re-ranking features of the plurality of images of the textual query in accordance with a supervised training algorithm. The query-independent re-ranking model may include a weighted linear combination of re-ranking features. The supervised training algorithm may train the query-independent re-ranking algorithm to obtain a plurality of weights (i.e., trained weights) associated with the re-ranking features of the weighted linear combination.

In some embodiments, the initial ranking result may then be re-ranked based at least upon the visual re-ranking features of the at least subset of the plurality of images and a query-independent re-ranking model.

In other embodiments, the initial ranking result may be re-ranked based at least upon initial rankings of the plurality of images, a neighborhood structure of the plurality of images, and pseudo-relevance feedback of a predetermined number of top images in the initial ranking result.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
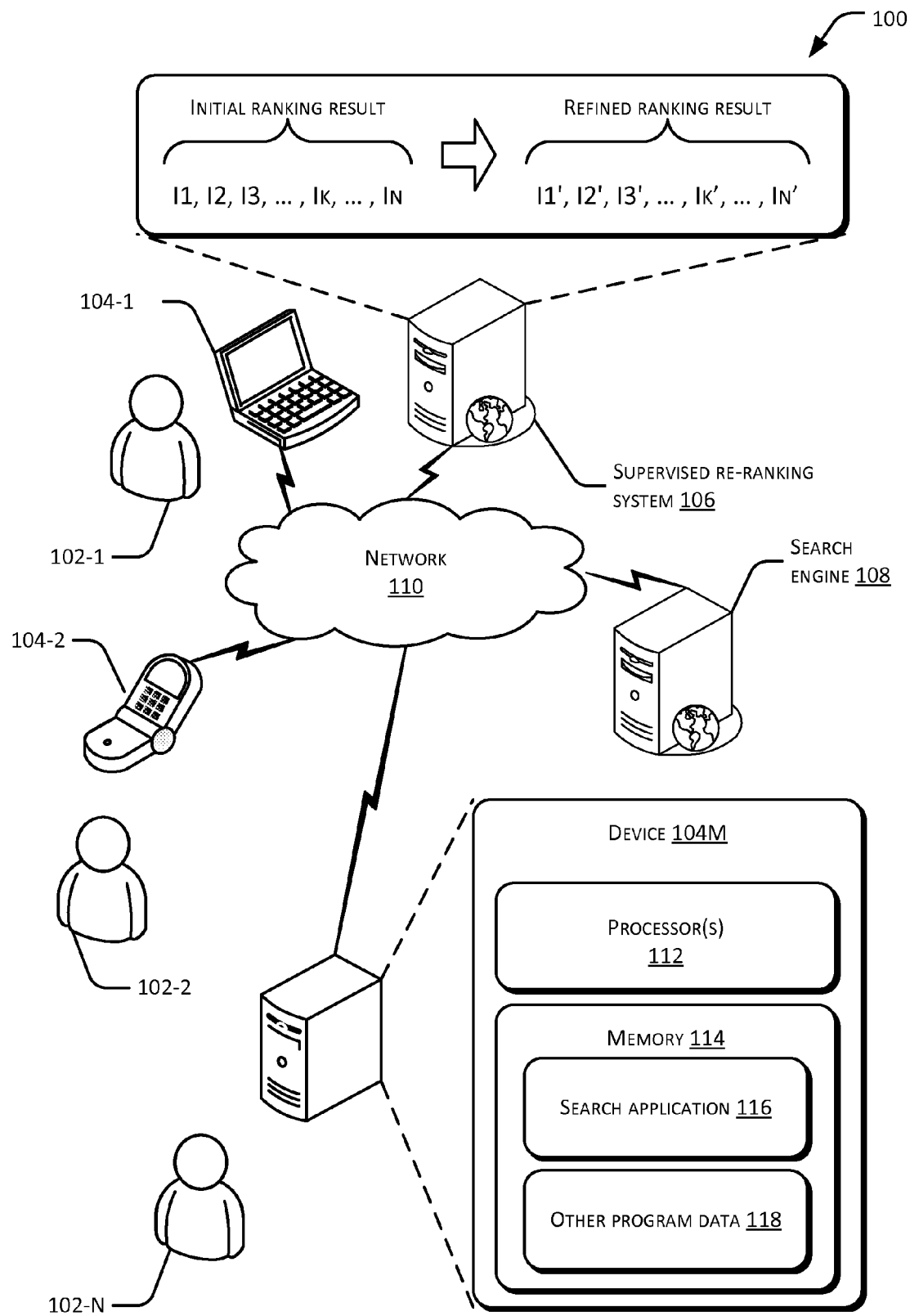
FIG. 1 illustrates an exemplary environment including an example supervised re-ranking system for visual search.

As noted above, accuracy of existing text-based image search depends on an availability and an accuracy of textual information associated with images. The performance of this text-based image search deteriorates or even fails to work if no such textual information and/or incorrect textual information exists for the images.

In view of these deficiencies, a visual search re-ranking algorithm may be used to re-rank images that are returned in a search result. Generally, a visual search re-ranking algorithm may include re-ordering images that are returned in response to a text-based image search by exploiting visual information included in the images. Re-ranking algorithms may be supervised or unsupervised. Unsupervised re-ranking algorithms learn a re-ranking function that is used to refine or re-rank the returned images without human supervision. Unsupervised re-ranking algorithms, however, require heuristic assumptions regarding the role of visual modality (e.g., human visual system) in determining relevance of the images and relative importance of the visual modality compared with an initial search result. These assumptions sometimes render re-ranking performance of the unsupervised re-ranking algorithm unpredictable.

This disclosure describes a supervised re-ranking algorithm for visual search that operates without making any heuristic assumptions such as those of the unsupervised re-ranking algorithm described above.

Generally, the supervised re-ranking algorithm receives a textual query and obtains an initial ranking result corresponding to the textual query. In one embodiment, the initial ranking result may be obtained, for example, using a conventional text-based image retrieval approach. The initial ranking result may include a plurality of images. In some embodiments, the plurality of images may be ordered in a specified order of ranking, e.g., in an order of decreasing relevance and/or confidence with respect to the textual query. Additionally or alternatively, the initial ranking result may include a confidence score or a relevance score for each returned image to represent a degree of confidence or relevance that the returned image is relevant to the textual query.

In response to obtaining the initial ranking result, the supervised re-ranking algorithm may represent the textual query in terms of a visual context of the plurality of images. In one embodiment, the visual context of the plurality of images may include visual features of the plurality of images, initial rankings of the plurality of images in the initial ranking result, and/or relationships among the plurality of images. The visual context facilitates determination of visual re-ranking features of the plurality of images which may include, but are not limited to, initial rankings of the plurality of images, contextual re-ranking features of the plurality of images, and/or pseudo relevance feedback re-ranking features of a predetermined number of top-ranked images. In one embodiment, the re-ranking features of the plurality of images may include no textual feature of the plurality of images and/or features that depend on textual information associated with the plurality of images. In another embodiment however, the re-ranking features of the plurality of images may include features depending on textual information associated with the plurality of images and/or statistical information of the textual information.

In one embodiment, the supervised re-ranking algorithm may re-rank the initial ranking result based on the one or more re-ranking features in the feature representation. Furthermore, in some embodiments, the supervised re-ranking algorithm may re-rank the initial ranking result without using any textual feature of the initial ranking result including textual information that is associated with the plurality of images and/or the textual query itself (e.g., the one or more keywords used in the textual query).

In one embodiment, the supervised re-ranking algorithm may re-rank the initial ranking result based at least upon the one or more re-ranking features of the plurality of images and a query-independent re-ranking model.

In some embodiments, the query-independent re-ranking model may be trained according to a supervised training algorithm. The query-independent re-ranking model may include a weighted combination of the re-ranking features. The supervised training algorithm may train the query-independent re-ranking model using human labeled data to obtain values for a plurality of weights that are associated with the re-ranking features of the query-independent re-ranking model.

In one embodiment, after training the query-independent re-ranking model, a textual query may be received from a client such as a user. An initial ranking result may be obtained in response to receiving the textual query from the client. The initial ranking result of the client may include a plurality of images corresponding to the textual query of the client. In one embodiment, a visual context of the plurality of images of the client may be used to represent the textual query of the client. The visual context may be used to determine visual re-ranking features of the plurality of images. The initial ranking result of the client may then be re-ranked based at least upon the visual re-ranking features of the plurality of images of the client and the trained query-independent re-ranking model. A re-ranked or refined ranking result may be presented to the client.

In one embodiment, this re-ranking process may be performed merely once without any iteration. In another embodiment, the re-ranking process may be performed iteratively and may end when a change between ranking results in two successive iterations is less than a predetermined threshold. In some embodiments, the change may include a change in ranking positions of a predetermined number of top-ranked images from one iteration to next iteration. In another embodiment, the change may include the number of images that are different within a predetermined number of top-ranked positions in the two successive iterations, regardless of respective absolute ranking positions within the predetermined number of top-ranked positions.

Through the supervised training algorithm, the re-ranking model can return a re-ranked or refined ranking result that is more desirable to the user who submits the textual query, thereby effectively improving efficiency of image search and enhancing image search experience of the user.

Multiple and varied implementations and embodiments are described below. In the following section, an exemplary environment that is suitable for practicing various implementations is described. After this discussion, illustrative implementations of systems, devices, and processes for supervised re-ranking for visual search are described.

Exemplary Architecture

FIG. 1 illustrates an exemplary environment 100 usable to implement supervised re-ranking for visual search. The environment 100 includes one or more users 102-1, 102-2, . . . 102-N (which are collectively referred to as 102), one or more client devices 104-1, 104-2, 104-3, . . . 104-M, which are collectively referred to as 104, a supervised re-ranking system 106, a search engine 108, and a network 110.

Each client device 104 may be implemented as any one of a variety of conventional computing devices including, for example, a server, a desktop PC, a notebook or portable computer, a workstation, a mainframe computer, a handheld device, a netbook, an Internet appliance, a portable reading device, an electronic book reader device, a tablet or slate computer, a television, a set-top box, a game console, a mobile device (e.g., a mobile phone, a personal digital assistant, a smart phone, etc.), a media player, a network router, etc. or a combination thereof. The client device 104 may further include any other device that is capable of implementing the techniques described in this application.

The network 110 may be a wireless network, a wired network, or a combination thereof. The network 110 may be a collection of individual networks interconnected with each other and functioning as a single large network (e.g., the Internet or an intranet). Examples of such individual networks include, but are not limited to, telephone networks, cable networks, Local Area Networks (LANs), Wide Area Networks (WANs), and Metropolitan Area Networks (MANs). Further, the individual networks may be wireless networks, wired networks, or a combination thereof.

In one embodiment, the client device 104 may include a processor 112 coupled to memory 114. The memory 114 may include a search application 116 such as a browser and other program data 118. The memory 114 may be coupled to, associated with, and/or accessible to other devices, such as network servers, routers, and/or other client devices 104.

In one embodiment, the user 102 may use the search application 116 to submit a textual query to the search engine 108. The search engine 108 may obtain an initial ranking result in response to receiving the textual query, and send the initial ranking result to the supervised re-ranking system 106. In another embodiment, the user 102 may submit the textual query to the supervised re-ranking system 106, which may obtain an initial ranking result corresponding to the textual query from therein or from the search engine 108.

Upon receiving the initial ranking result, the supervised re-ranking system 106 may re-rank the initial ranking result to obtain a re-ranked or refined ranking result. In one embodiment, the supervised re-ranking system 106 may send the refined ranking result or a refined index of images back to the search engine 108. Alternatively, the supervised re-ranking system 106 may send the refined ranking result directly to the client device 104 for display to the user 102.

Although the supervised re-ranking system 106 and the search engine 108 are described as separate systems, the supervised re-ranking system 106 and the search engine 108 may be parts of a single system. In one embodiment, the supervised re-ranking system 106 may be a part of the search engine 108. Alternatively, the supervised re-ranking system 106 may include the search engine 108 and provide image search service to the user 102.

Figure 2:
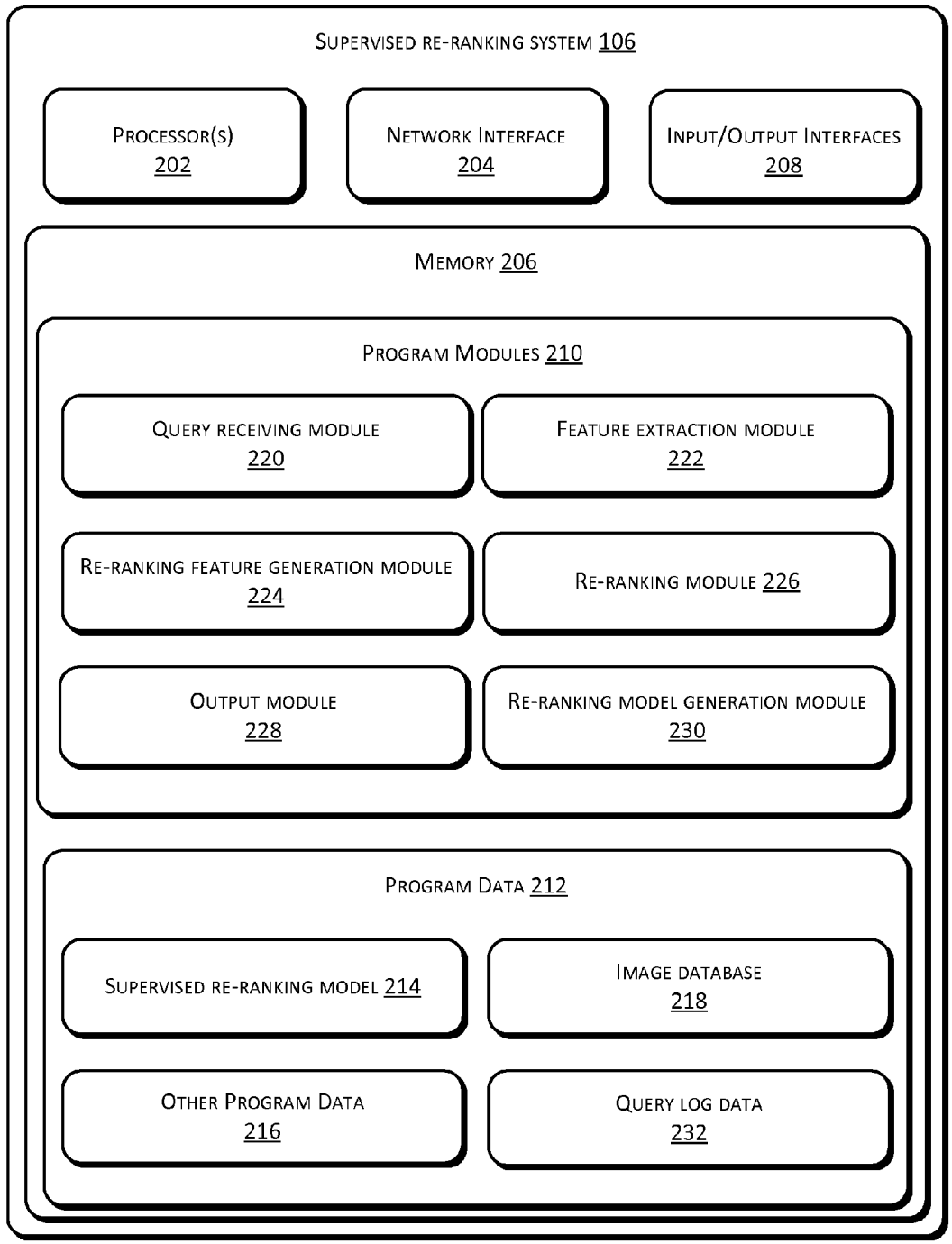
FIG. 2 illustrates an example supervised re-ranking system of FIG. 1 in more detail.

FIG. 2 illustrates various components of the example supervised re-ranking system 106 in more detail. In one embodiment, the system 106 can include, but is not limited to, a processor 202, a network interface 204, memory 206, and an input/output interface 208.

The memory 206 may include computer-readable media in the form of volatile memory, such as Random Access Memory (RAM) and/or non-volatile memory, such as read only memory (ROM) or flash RAM. The memory 206 is an example of computer-readable media. Computer-readable media includes at least two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

The memory 206 may include program modules 210 and program data 212. The program data 212 may include modeling data of a query-independent re-ranking model 214 and other program data 216. Additionally, the program data 212 may further include an image database 218. The image database 218 may include training images that may be used for training the query-independent re-ranking model 214. Additionally, the image database 218 may further include images that can be retrieved in response to receiving a textual query in a text-based image search. In one embodiment, the training images in the image database 218 may be labeled by one or more entities as to their relevance with respect to one or more textual queries. The one or more entities may include one or more human users 102, one or more computing devices capable of performing image recognition, and/or a combination thereof.

The supervised re-ranking system 106 may include a query receiving module 220. The query receiving module 220 may receive a textual query sent from the user 102 and/or the search engine 108.

In one embodiment, in response to receiving the textual query, the supervised re-ranking system 106 may obtain an initial ranking result. The supervised re-ranking system 106 may obtain the initial ranking result from the image database 218. Additionally or alternatively, the supervised re-ranking system 106 may obtain the initial ranking result from the search engine 108. Alternatively, the supervised re-ranking system 106 may obtain an index list indicating a list of images stored in the image database 218 from the search engine 108. In one embodiment, the initial ranking result may include a plurality of images corresponding to the textual query. Additionally, the initial ranking result may include the plurality of images arranged in a specified ranking order, e.g., in an order of decreasing relevance with respect to the textual query. Additionally or alternatively, the initial ranking result may further include confidence or relevance scores for the plurality of images.

In one embodiment, in response to obtaining the initial ranking result, the supervised re-ranking system 106 may include a feature extraction module 222 to extract visual features from the plurality of images included in the initial ranking result. In other embodiments, visual features of the plurality of images may be pre-extracted beforehand, for example, prior to receiving the textual query. By way of example and not limitation, visual features of the plurality of images may be pre-extracted by the feature extraction module 222 when the plurality of images are crawled or obtained by the supervised re-ranking system 106. The extracted visual features of the plurality of images may be stored with the plurality of images in the image database 218.

In either case, the feature extraction module 222 may extract visual features from a predetermined number of top-ranked images from the initial ranking result. In some embodiments, the predetermined number of top-ranked image is less than the total number of images included in the initial ranking result (e.g., 1%, 5%, or 10% of the total number of returned images). In another embodiment, the feature extraction module 222 may extract visual features from the entire set of the plurality of images of the initial ranking result. In either case, the visual features may include, but are not limited to, attention guided color signature, color fingerprint, multi-layer rotation invariant edge orientation histogram EOH, histogram of gradients, Daubechies wavelet, facial features and/or black and white.

In one embodiment, the supervised re-ranking system 106 may further represent the textual query in terms of the visual features extracted by the feature extraction module 222. Specifically, the supervised re-ranking system 106 may transform the textual query from a textual representation (such as one or more keywords included in the textual query) to a feature representation defined by the visual features that are determined by the feature extraction module 222. In one embodiment, the textual query in the textual representation (e.g., the one or more keywords) may not be used for re-ranking the initial ranking result. Additionally or alternatively, textual information associated with the plurality of image such as surrounding text, anchor text and uniform resource locator (URL) may not be used for re-ranking the initial ranking result. In other embodiments, the textual information associated with the plurality of images and/or the one or more keywords in the textual query may further be used for re-ranking the initial ranking result.

Upon representing the textual query in terms of the extracted visual features of the plurality of images (e.g., from the predetermined number of top-ranked images), the supervised re-ranking system 106 may include a re-ranking feature generation module 224 to develop one or more re-ranking features for the textual query. In one embodiment, the one or more re-ranking features may include features that are independent of any textual information associated with the plurality of images. In some embodiments, the one or more re-ranking features may include prior re-ranking features, contextual re-ranking features and pseudo relevance feedback re-ranking features of the plurality of images included in the initial ranking result.

The prior re-ranking features may include initial rankings of the plurality of images in the initial ranking result. Additionally or alternatively, the prior re-ranking features may include confidence scores or relevance scores of the plurality of images with respect to the textual query, if the scores are available in the initial ranking result. The contextual re-ranking features of a target image may include visual contextual information of the plurality of images by considering the plurality of images as visual contextual information of the target image. The pseudo relevance feedback re-ranking features may be obtained by considering a predetermined number of top-ranked images (e.g., 50, 100, 500, etc.) as positive examples (i.e., relevant images of the textual query) and ranking other images based on these positive examples.

In response to obtaining the re-ranking features, the supervised re-ranking system 106 may represent the textual query using a visual context of the plurality of images in the initial ranking result. The visual context may include, but is not limited to, visual features of the plurality of images, initial rankings of the plurality of images in the initial ranking result, and/or relationships among the plurality of images. The supervised re-ranking system 106 may further include a re-ranking module 226 to re-rank the initial ranking result using the re-ranking features. Additionally, the re-ranking module 226 may further re-rank the initial result based on the query-independent re-ranking model 214. In one embodiment, the re-ranking module 226 may compute relevance or confidence scores for the plurality of images based upon the re-ranking features of the plurality of images and the query-independent re-ranking model 214. The re-ranking module 226 may re-rank the plurality of images in the initial ranking result based upon the computed scores. In some embodiments, the re-ranking module 226 may re-rank a predetermined number of top-ranked images in the initial ranking result while leaving other low-ranked images untouched.

Upon re-ranking the initial ranking result, the supervised re-ranking system 106 may send the re-ranked or refined ranking result, through an output module 228, to the user 102 or the search engine 108 which may in turn forward the re-ranked or refined ranking result to the user 102.

In one embodiment, the supervised re-ranking system 106 may include a re-ranking model generation module 230 to develop the query-independent re-ranking model 214. In one embodiment, the query-independent re-ranking model 214 may include a weighted combination of re-ranking features. In some embodiments, the weighted combination may include a combination of re-ranking features, which is linear with respect to weights associated with the re-ranking features. The query-independent re-ranking model 214 may be trained according to a supervised training algorithm using the labeled training images stored in the image database 218 and one or more textual queries associated therewith. The following section describes additional details of generating the supervised re-ranking model 214 using a supervised re-ranking algorithm/learning-to-re-rank algorithm.

Supervised Re-Ranking Algorithm/Learning-to-Re-Rank Algorithm

In one embodiment, the supervised re-ranking algorithm may include two operations: a learning operation and a feature design operation. For the learning operation, a Ranking Support Vector Machine (SVM) or other learning model such as a neural network model and/or a Bayesian network may be used to solve a learning problem in the re-ranking context. For the feature design operation, re-ranking features, which are based upon exploitation of visual contextual information, initial rankings and pseudo relevance feedback of the plurality of images, may be designed.

Formulation

Definition 1: A ranking $r$ is a function mapping from a document set $D$ to a position vector $1, 2, \ldots, N$. For example, $r(d_j)$, abbreviated as $r_j$, refers to a ranked position of a document $d_j \in D$.

Specifically, in a context of an image search, $D$ is used to denote a set of image documents or files returned by an initial image search.

Definition 2: A re-ranking model may be defined as a function $$r = f(D, \bar{r}, q) \qquad (1)$$

where $q$ refers to a query and $r$ refers to initial rankings of documents returned in the initial search result corresponding to the query $q$.

Generally, the supervised re-ranking system 106 aims to return a new ranking result after taking the query, the initial ranking result and the initial rankings as inputs. In one embodiment, the query term $q$ may be ignored from Equation (1) because $q$ may be reflected in the initial ranking result $D$ and the initial ranking $\bar{r}$. An objective of the supervised re-ranking algorithm or learning-to-re-rank algorithm may be therefore to learn the re-ranking model $f$ from training data.

Definition 3: Learning-to-re-rank may be defined as a process of learning a re-ranking model $f$ from given training samples $\{D^i, \bar{r}^i, q^i, r^i\}$, where $D^i, \bar{r}^i, r^i$ are initially returned documents, initial rankings and ground-truth rankings corresponding to a query $q^i$. The learning process may be formulated as a process of minimizing a loss function $$f^* = \arg\min_f \Sigma_i \Delta(r^i, f(D^i, \bar{r}^i, q^i)) \qquad (2)$$

where $\Delta$ measures a loss between the ground-truth $r^i$ and a prediction $\hat{r}^i = f(D^i, \bar{r}^i, q^i)$.

Re-Ranking Model

The supervised re-ranking system 106 or the supervised re-ranking algorithm may take into account at least two pieces of information to obtain a re-ranked or refined ranking result. The first piece of information may refer to initial rankings of a plurality of images returned in an initial ranking result from a text-based image search. The second piece of information may refer to a visual content of the plurality of images returned in the initial ranking result, which may be regarded as visual contextual information in which information need of a user who submits a corresponding textual query may be formulated. Based thereupon, a re-ranking model, which combines these two pieces of information, may be defined as follows:

$$f(D^i, \bar{r}^i, q^i) = \arg\max_{r^i} (-\omega_0 d(r^i, \bar{r}^i) + \Sigma_{j=1}^Z \omega_j r^i \cdot \psi_j(D^i, \bar{r}^i)) \qquad (3)$$

where $d(r^i, \bar{r}^i)$ is a distance between two rankings $r^i$ and $\bar{r}^i$, $\psi_j$ are functions steering re-ranking feature extraction processes applied to the images in the initial ranking result, and $\omega = [\omega_0, \omega_1, \ldots, \omega_Z]^T$ are weighting coefficients. An idea of Equation (3) may include maximizing a bias of a re-ranked ranking result toward the initial ranking result while at the same time maximizing coherence of the images ranked similarly in terms of the re-ranking features.

In one embodiment, the distance $d(r^i, \bar{r}^i)$ between the two rankings $r^i$ and $\bar{r}^i$ may be measured using a Normalized Discounted Cumulative Gain (NDCG) and/or a Kendall's $\tau$ ranking correlation. In another embodiment, in order to allow a solution of Equation (3) to be a linear function with respect to the weighting coefficients $\omega$, the ranking distance $d(r^i, \bar{r}^i)$ may be computed by transforming the initial rankings into a score vector:

$$d(r^i, \bar{r}^i) = -r^i \cdot s(\bar{r}^i) \qquad (4)$$

where $s(\bar{r}^i)$ is a score vector with $s(\bar{r}^i)_j$ corresponding to a ranking score of an image ranked at the j-th position in the initial ranking result.

By substituting Equation (4) into Equation (3), the re-ranking model may be formulated as:

$$f(D^i, \vec{r}^i, q^i) = \arg\max_{\vec{r}^i} \Sigma_{j=0}^{Z} \omega_j \vec{r}^i \cdot \omega_j (D^i, \vec{r}^i) \quad (5)$$

where $\psi_0(D^i, \vec{r}^i) = s(\vec{r}^i)$. A solution of Equation (5) is:

$$f(D^i, \vec{r}^i, q^i) = \text{sort by } \Sigma_{j=0}^{Z} \omega_j \psi_j(D^i, \vec{r}^i) \quad (6)$$

where the initial ranking score may be one of the re-ranking features.

Therefore, a linear model for re-ranking may be achieved by combining different re-ranking features, where the initial rankings may also be included as ones of the re-ranking features.

Ranking Support Vector Machine (SVM)

As described in the foregoing paragraphs, the objective of the learning-to-re-rank task is to estimate parameters by minimizing a loss function. Methods differing in the design of this loss function may be used for this purpose. In one embodiment, a ranking support vector machine (SVM), where a loss function is defined as a combination of a prediction loss and a regularization term, may be used:

$$\Delta(r^i, f(D^i, \vec{r}^i, q^i)) = \frac{1}{2}\omega^T\omega$$

$$+ C\Sigma_{d_j^i >_{r^i} d_k^i} \max(0, 1 - \omega^T(\omega_j(d^i, \vec{r}^i) - \omega_j(d_k^i, \vec{r}^i))) \quad (7)$$

where the first term of Equation (7) is a regularization term and the second term is a hinge loss on document pairs. Here, $d_j^i >_{r^i} d_k^i$ denotes that an image $d_j^i$ is ranked before an image $d_k^i$ in the initial ranking result $r^i$. C is a trade-off parameter.

By substituting the loss function defined by Equation (7) into Equation (2), the following optimization problem may be obtained:

$$\min \frac{1}{2}\omega^T\omega + C\sum \xi_{jk}^i \quad (8)$$

$$\text{s.t. } \forall i, d_j^i >_{r^i} d_k^i: \omega^T(\psi_j(d_j^i, \vec{r}^i) - \psi_j(d_k^i, \vec{r}^i)) \geq 1 - \xi_{jk}^i$$

$$\forall i, j, k: \xi_{j,k}^i \geq 0$$

A rationale behind the ranking SVM is to model the prediction loss based on preference between two documents. Furthermore, while Z dimensions attribute to the visual content analysis, only one dimension is related to the initial rankings in the initial ranking result. Moreover, the initial rankings may be a good information source for re-ranking because these initial rankings often provide a reasonable result. In one embodiment, since in the problem formulation (i.e., Equation (8)), influence of the initial rankings is likely to be degraded, and even severely degraded if Z is large, Equation (8) may further modified to allow the initial rankings to provide a larger contribution to the model, for example, by re-formulating Equation (8) as:

$$\min \frac{1}{2}\left(\left(\frac{\omega_0}{\alpha}\right)^2 + \sum_{t=1}^{Z} \omega_t^2\right) + C\sum \xi_{jk}^i$$

$$\text{s.t. } \forall i, d_j^i >_{r^i} d_k^i: \omega^T(\psi_j(d_j^i, \vec{r}^i) - \psi_j(d_k^i, \vec{r}^i)) \geq 1 - \xi_{jk}^i$$

$$\forall i, j, k: \xi_{jk}^i \geq 0 \quad (9)$$

where $\alpha$ is a system-defined or user-defined parameter to control confidence of corresponding feature from the initial rankings. In one embodiment, $\alpha$ may be set to be Z.

The above optimization problem (i.e., Equation (9)) may be solved using any conventional optimization method. In one embodiment, Sequential Minimal Optimization (SMO) may be used to solve the above optimization problem. In another embodiment, a fast algorithm based on a cutting-plane method may be used to solve this optimization problem.

Re-Ranking Features

The re-ranking model may include a variety of re-ranking features. The re-ranking features may include, but are not limited to, prior re-ranking features, contextual re-ranking features and pseudo relevance feedback features. In one embodiment, by considering a result of an initial text-based image search as a strong prior, $\psi_0(D^i, \vec{r}^i)$ based on initial rankings may be referred to as the prior re-ranking features. In some embodiments, the contextual re-ranking features may refer to features that are obtained by considering the plurality of images returned in the initial ranking result as visual contextual information of a target image. In one embodiment, the pseudo relevance feedback features may refer to features that are obtained by considering a predetermined number of top N images as positive examples and then by ranking the other images in the initial ranking result based on these positive examples.

Contextual Re-Ranking Features

Visual contextual information of an image in the initial ranking result may reflect information of a neighborhood structure of the plurality of images in the initial ranking result, and may therefore be a useful information source for refining the initial ranking result. Hereinafter, various feature exploitation methods are described to exploit visual contextual information for re-ranking the ranking result.

Given an image $d_j \in D$, where D is an initial ranking result returned by a text-based image search based on a textual query q, visual neighbors of the image $d_j$ in D may be computed based on various strategies. By way of example and not limitation, the various strategies may include K-Nearest Neighbors (KNN), ϵ-Nearest Neighbors (ϵNN), and a combination thereof. In K-Nearest Neighbors (KNN), the top K images in D that are similar to the image $d_j$ may be regarded as neighbors of the image $d_j$. In ϵ-Nearest Neighbors (ϵNN), images in D which distance to $d_j$ is less than a predetermined or user-defined threshold ϵ may be regarded as neighbors of the image $d_j$. In the combination of KNN and ϵNN, images which satisfy both KNN and ϵNN may be regarded as neighbors of the image $d_j$ in D.

Neighbors of the image $d_j$ that are obtained based on one or more of the above strategies may form a set $N_j$. In one embodiment, these neighbors of the image $d_j$ may be ranked according to respective visual similarity with respect to the image $d_j$. For example, the neighbors of the image $d_j$ may be ranked in a descending of visual similarity with respect to the image $d_j$. In this set $N_j$, $N_j^k$ represents the k-th image on this ranked neighbors set or list.

Additionally or alternatively, a reciprocal neighborhood of an image $d_j$ may be defined, for example, by the supervised re-ranking system 106 or the user 102. Specifically, if an image $d_i$ occurs as a neighbor of an image $d_j$, the image $d_j$ may then be referred to as a reciprocal neighbor of the image $d_i$. Formally, given an image $d_i$, a set of its reciprocal neighbors may be defined as:

$$R(d_i) = \{d_j | d_i \in N^j\} \quad (10)$$

Depending on which strategy is used for determining neighbors of an image, the neighbors and the reciprocal neighbors may be different. Therefore, in one embodiment, visual contextual information of an image may be defined by its neighbors and/or reciprocal neighbors taken from an initial ranking result.

Neighborhood Rank Voting

Upon obtaining the visual contextual information of the plurality of images in the initial ranking result, the re-ranking module 226 may compute re-ranking features based on the visual contextual information. In one embodiment, a neighborhood voting may be used to obtain re-ranking features from the visual contextual information. The neighborhood voting may include different variants. By way of example and not limitation, the neighborhood voting may include a hard voting. In hard voting, each neighbor of an image $d_j$ contributes equally to relevance of the image $d_j$:

$$HV_N(d_j) = \text{Count}(N^j) \qquad (11)$$

As can be seen in Equation (11), a hard voting score of the image $d_j$ corresponds to a set cardinality of a neighborhood of the image $d_j$.

Additionally or alternatively, the neighborhood voting may include a soft voting. In soft voting, different neighbors of an image $d_j$ may contribute differently to relevance of the image $d_j$ according to respective relevance to a target image of corresponding textual query. In one embodiment, a relevance of an image may be defined or expressed as an initial ranking of the image in an initial ranking result and/or a position of the image in a ranked neighborhood. For example, a soft voting for an image based on initial rankings of its neighbors may assign weights to votes from the neighbors using the following equation:

$$RSV_N(d_j) = \sum_{d_i \in N^j} \frac{1}{\log(\bar{r}(d_i) + 1)} \qquad (12)$$

A logarithm function is included in this transformation from the initial rankings of neighbors of an image $d_j$ to voting scores of the neighbors of the image $d_j$. This logarithm function is used to account for a discount term in Normalized Discounted Cumulative Gain (NDCG), which assigns a larger importance or confidence value to higher ranked images in the returned ranking result.

Additionally or alternatively, voting scores of the neighbors of the image $d_j$ may be weighed by respective adjacency to a target image of corresponding query. In one embodiment, an adjacency of a neighbor to a target image may be measured by a position of the neighbor in the ranked neighborhood of the image $d_j$. By way of example and not limitation, a soft voting based on a neighbor-rank-weighted initial ranking may be computed as:

$$NRSV_N(d_j) = \sum_{i=1}^{k} \frac{1}{\log(\bar{r}(N_i^j) + 1) \times i} \qquad (13)$$

where k is the number of neighbors.

Reciprocal Neighborhood Rank Voting

Similar to the neighborhood rank voting as described above, a reciprocal neighborhood voting may include a hard voting and a soft voting. Corresponding re-ranking features based on reciprocal neighbors may be computed with an analogy to Equations (11), (12) and (13):

$$HV_R(d_j) = \text{Count}(R(d_j)) \qquad (14)$$

$$RSV_R(d_j) = \sum_{d_i \in R(d_j)} \frac{1}{\log(\bar{r}(d_i) + 1)} \qquad (15)$$

$$NRSV_R(d_j) = \sum_{d_i \in R(d_j)} \frac{1}{\log(\bar{r}(d_i) + 1) \times P(d_j, d_i)} \qquad (16)$$

where $P(d_j, d_i)$ is a ranked position of $d_i$ in the neighbors of $d_i \in R(d_j)$.

Additionally or alternatively, the reciprocal neighborhood rank voting may further include a voting based on a ranked position of a target image in neighborhoods of reciprocal neighbors, which represents how confidently other images will select the target image as a neighbor. Therefore, in one embodiment, a soft voting, which takes reciprocal neighborhood rank into consideration, may be defined as:

$$NSRV_R(d_j) = \sum_{d_i \in R(d_j)} \frac{1}{\log(\bar{r}(d_i) + 1) \times P(d_j, d_i)} \qquad (17)$$

Pseudo Relevance Feedback

An idea of pseudo relevance feedback (PRF) in a context of visual search re-ranking is to regard a predetermined number of top ranked images in the initial ranking result as relevant images, and then to apply a relevance feedback technique or algorithm on these "pseudo" relevant images to refine or re-rank the initial ranking result.

In one embodiment, given the top m pseudo relevant images in the initial ranking result, the re-ranking module 226 may compute a re-ranking feature of $d_j$ by estimating corresponding relevance score as a probability of generating $d_j$ from these m images:

$$PRF(d_j) = p(d_j | d_1, d_2, \ldots, d_m) \qquad (18)$$

where p(•) is a probability density function and $d_1, d_2, \ldots, d_m$ are the top m images in the initial ranking result. In some embodiments, the function p(•) may be estimated using a kernel density estimation (KDE) approach. A KDE-based PRF feature may then be computed as:

$$PRF_d(d_j) = \frac{1}{m} \sum_{i=1}^{m} \frac{1}{\sqrt{2\pi}\,\sigma} \delta(d_j, d_i) \qquad (19)$$

$$\delta(d_j, d_i) = \exp(-(d_j - d_i)^2 / (2\sigma^2)) \qquad (20)$$

where δ is a radial basis function (RBF) kernel and σ represents a standard deviation. δ and σ may be system-defined or user-defined parameters.

Additionally or alternatively, the re-ranking module 226 may compute PRF features based on duplicate voting. For example, the re-ranking module 226 may compute PRF features based on a hard voting and/or a soft voting that are similar to the contextual re-ranking features. Instead of using the entire initial ranking result however, the PRF features may be based on the m top-ranked images:

$$PRF_{dv}(d_j) = \frac{1}{m}\sum_{t=1}^{m} IsDup(d_j, d_i) \quad (21)$$

$$PRF_{sdv}(d_j) = \frac{1}{m}\sum_{t=1}^{m} \frac{IsDup(d_j, d_i)}{\log(\bar{r}(d_i)+1)} \quad (22)$$

where IsDup(•) may be any duplicate detection function. In one embodiment, a duplicate detection function may include a predetermined threshold. Two images may be determined to be duplicates based on a visual similarity between the two images. For example, if the visual similarity between the two images are greater than the predetermined threshold, the images may be determined to be duplicates of one other.

In one embodiment, a potential query drifting problem may exist due to a possible performance degradation of PRF-based r-ranking features compared to initial rankings. However, as weights associated with the PRF-based re-ranking features are learned using a supervised learning algorithm, e.g., using human-labeled rankings, if a PRF-based re-ranking feature does not perform satisfactorily in a given use case, this PRF-based re-ranking feature may receive a low weight and hence may not influence a final or re-ranked result to a large extent.

Initial Rankings

As described in the foregoing paragraphs, initial rankings may provide input information for the re-ranking step. In most cases, the initial ranking result returned by the search engine 108 includes only rankings or ranking positions of images in the initial ranking result, but not ranking scores of the images. Furthermore, a widely used evaluation measure NDCG (i.e., normalized discounted cumulative gain) may be employed to act as a discount factor for emphasizing top-ranked images. In other words, top images returned in a text-based image search result may have larger confidence to be relevant, and this confidence may degrade super-linearly with images with lower ranking positions. In view of this, in one embodiment, the initial rankings may be transformed by following an analogy to the discount factor in NDCG to obtain a re-ranking feature which still reflects the initial rankings, but also takes into account an non-linearity of relevance confidence degradation because of the discount factor used in NDCG:

$$IR(d_j) = 1/\log(j+1) \quad (23)$$

where j is a ranking position of an image $d_j$ in the initial ranking result.

Table 1 below summarizes the re-ranking features that have been described in the foregoing paragraphs.

TABLE 1

An overview of re-ranking features

| Re-ranking Features | Meanings |
| --- | --- |
| $HV_N$ | Hard voting of neighbors |
| $RSV_N$ | Initial rank based soft voting of neighbors |
| $NRSV_N$ | Neighbor rank weighted initial rank based soft voting of neighbors |
| $HV_R$ | Hard voting of reciprocal neighbors |
| $RSV_R$ | Initial rank based soft voting of reciprocal neighbors |
| $NRSV_R$ | Neighbor rank weighted initial rank based soft voting of reciprocal neighbors |
| $NSV_R$ | Neighbor rank based soft voting of reciprocal neighbors |
| $PRF_d$ | Local density estimation for PRF |
| $PRF_{dv}$ | Duplicate voting for PRF |
| $PRF_{sdv}$ | Soft duplicate voting for PRF |
| IR | Initial ranking |

Alternative Embodiments

In one embodiment, the program data 212 of the supervised re-ranking system 106 may further include query log data 232. The query log data 232 may include, but are not limited to, statistics about the plurality of images such as number of views and/or number of click-through of the plurality of images, historical user actions associated with the plurality of images such as saving the plurality of images locally. The supervised re-ranking system 106 may re-rank the initial ranking result further based on the query log data 232. By way of example and not limitation, the supervised re-ranking system 106 may add an additional re-ranking feature representing query log data 232 into the query-independent re-ranking model 214. This query log re-ranking feature may assign a higher score (and hence a higher rank position) to an image which has a higher number of click-through or a higher click-through rate.

In some embodiments, the supervised re-ranking system 106 may re-rank an initial ranking result through a combination of supervised and unsupervised approach. For example, the supervised re-ranking system 106 may first re-rank the initial ranking result using an unsupervised approach such as clustering-based, classification-based and/or graph-based approaches. The supervised re-ranking system 106 may then re-rank the refined ranking result using the supervised re-ranking algorithm as described above.

In another embodiment, the query-independent re-ranking model 214 may further include a re-ranking feature that aims at developing diversity of images in a refined ranking result. In one embodiment, this diversity re-ranking feature may include a factor that may penalize contributions of re-ranking features due to similar images. Additionally or alternatively, the diversity re-ranking feature may compute a similarity score for a predetermined number of top-ranked images using any conventional similarity measurement based on visual features. In one embodiment, the higher the similarity score is, the more similar top-ranked images of the predetermined number are. This similarity score or the diversity re-ranking feature based thereupon may then be added to the query-independent re-ranking model to enhance diversity of re-ranked images or top-ranked images of a specified predetermined number.

Exemplary Methods

Exemplary methods for supervised re-ranking for visual search are described with reference to FIGS. 3-5. These exemplary methods can be described in the general context of computer executable instructions. Generally, computer executable instructions can include routines, programs, objects, components, data structures, procedures, modules, functions, and the like that perform particular functions or implement particular abstract data types. The methods can also be practiced in a distributed computing environment where functions are performed by remote processing devices that are linked through a communication network. In a distributed computing environment, computer executable instructions may be located both in local and remote computer storage media, including memory storage devices.

The exemplary methods are illustrated as a collection of blocks in a logical flow graph representing a sequence of operations that can be implemented in hardware, software, firmware, or a combination thereof. The order in which the methods are described is not intended to be construed as a limitation, and any number of the described method blocks can be combined in any order to implement the methods, or alternate methods. Additionally, individual blocks may be deleted from the methods without departing from the spirit and scope of the subject matter described herein. In the context of software, the blocks represent computer instructions that, when executed by one or more processors, perform the recited operations. For ease of illustration the methods are described in the context of the example environment and systems of FIGS. 1 and 2, but the methods are not limited to being performed in the environment or using the systems described herein.

Figure 3:
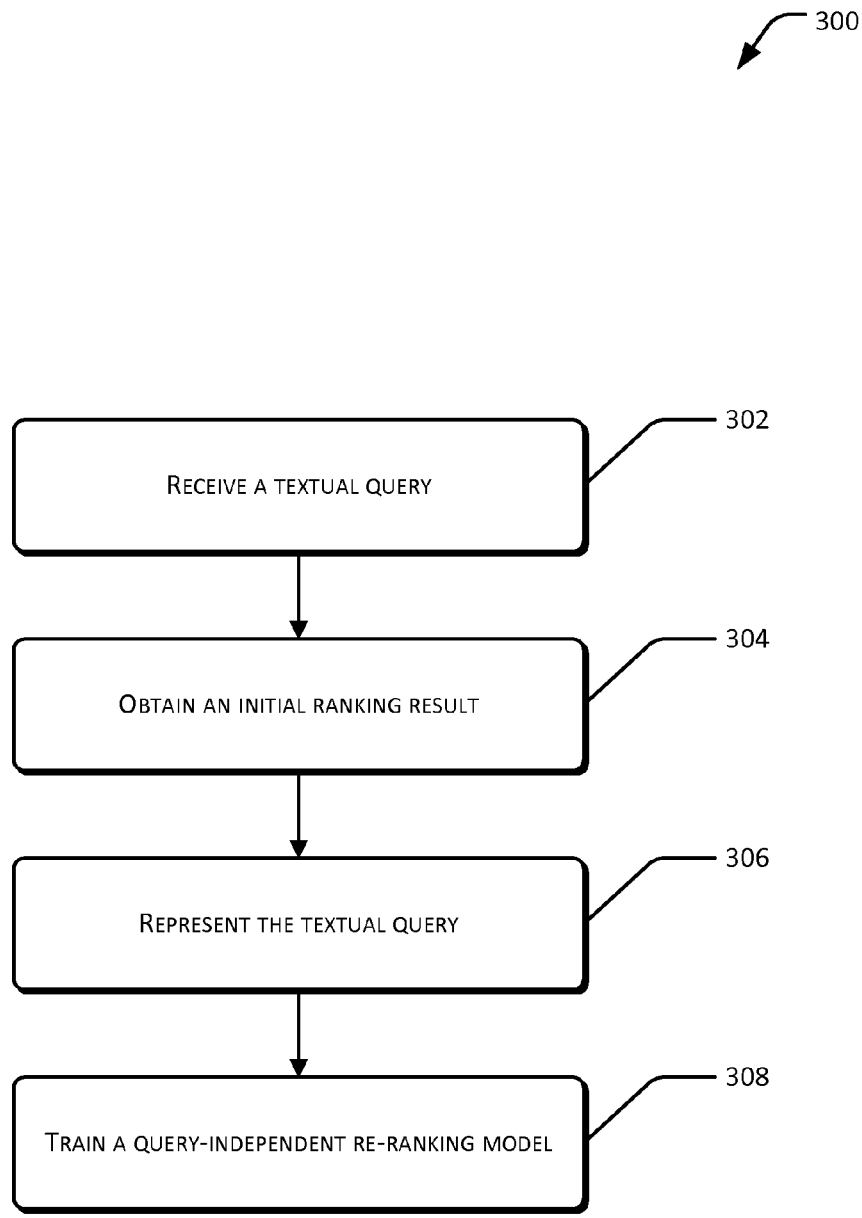
FIG. 3 illustrates a first exemplary method of supervised re-ranking for visual search.

FIG. 3 illustrates a first exemplary method 300 of supervised re-ranking for visual search.

At block 302, the supervised re-ranking system 106 may receive a textual query from, for example, the user 102 through the client device 104. The textual query may include one or more keywords.

At block 304, the supervised re-ranking system 106 may obtain an initial ranking result. The initial ranking result may include a plurality of images. The initial ranking result may further include initial rankings of the plurality of images. In one embodiment, the initial ranking result may order the plurality of images in a specified order, e.g., in an order of decreasing degree of relevance of an image with respect to the textual query.

At block 306, the supervised re-ranking system 106 may represent the textual query by a visual context of the plurality of images. Specifically, the supervised re-ranking system 106 may transform a representation of the textual query from a textual representation into a feature representation. In one embodiment, the visual context of the plurality of images may facilitate determination of prior re-ranking features, contextual re-ranking features and/or pseudo relevance feedback features of the plurality of images. Additionally or alternatively, the visual context of the plurality of images does not include any textual feature of the plurality of images and/or textual information associated with the plurality of images.

At block 308, the supervised re-ranking system 106 may train a query-independent re-ranking model according to a supervised training algorithm. In one embodiment, the query-independent re-ranking model may include a weighted combination of re-ranking features. The supervised re-ranking system 106 may train the query-independent re-ranking model using the re-ranking features of the plurality of images and human-labeled rankings that are determined by one or more persons to obtain a set of weights for the re-ranking features of the model. In some embodiments, the weighted combination of the model may include a weighted linear combination of the re-ranking features.

Figure 4:
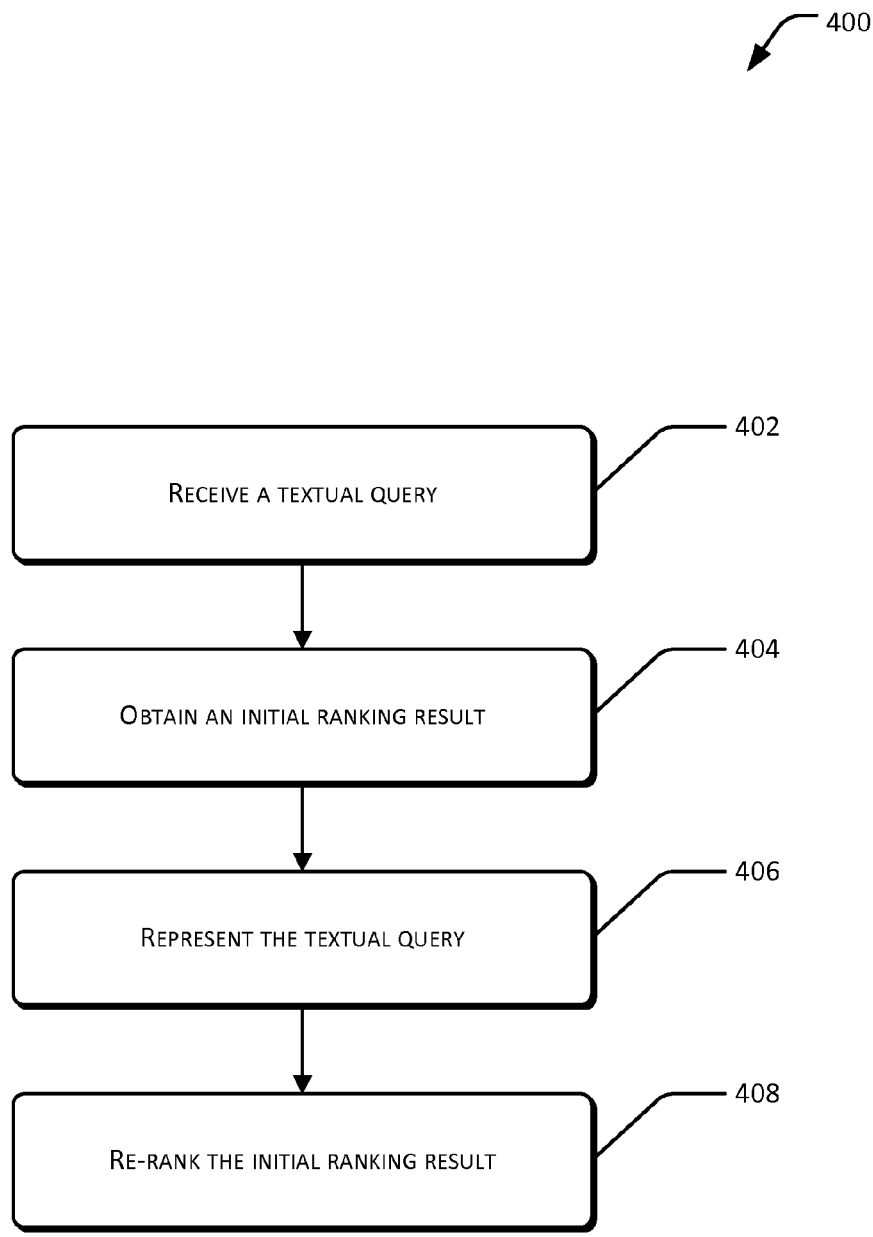
FIG. 4 illustrates a second exemplary method of supervised re-ranking for visual search.

FIG. 4 illustrates a second exemplary method 400 of supervised re-ranking for visual search.

At block 402, the supervised re-ranking system 106 may receive a textual query from a client. In one embodiment, the client may be the user 102. In another embodiment, the client may be the search engine 108.

At block 404, the supervised re-ranking system 106 may obtain an initial ranking result corresponding to the textual query. In one embodiment, the initial ranking result may include a plurality of images in a specified ranking order.

At block 406, the supervised re-ranking system 106 may represent the textual query by a visual context of at least a subset of the plurality of images in the initial ranking result. In one embodiment, no textual information including textual information associated with the at least subset of the plurality of images, textual features of the at least subset of the plurality of images, and/or one or more keywords included in the textual query may be included to represent the textual query.

At block 408, the supervised re-ranking system 106 may re-rank the initial ranking result based at least upon re-ranking features of the at least subset of the plurality of images and a query-independent re-ranking model. The re-ranking features may be determined using the visual context of the at least subset of the plurality of images. The supervised re-ranking system 106 may train the query-independent re-ranking model according to a supervised training algorithm as described above.

Figure 5:
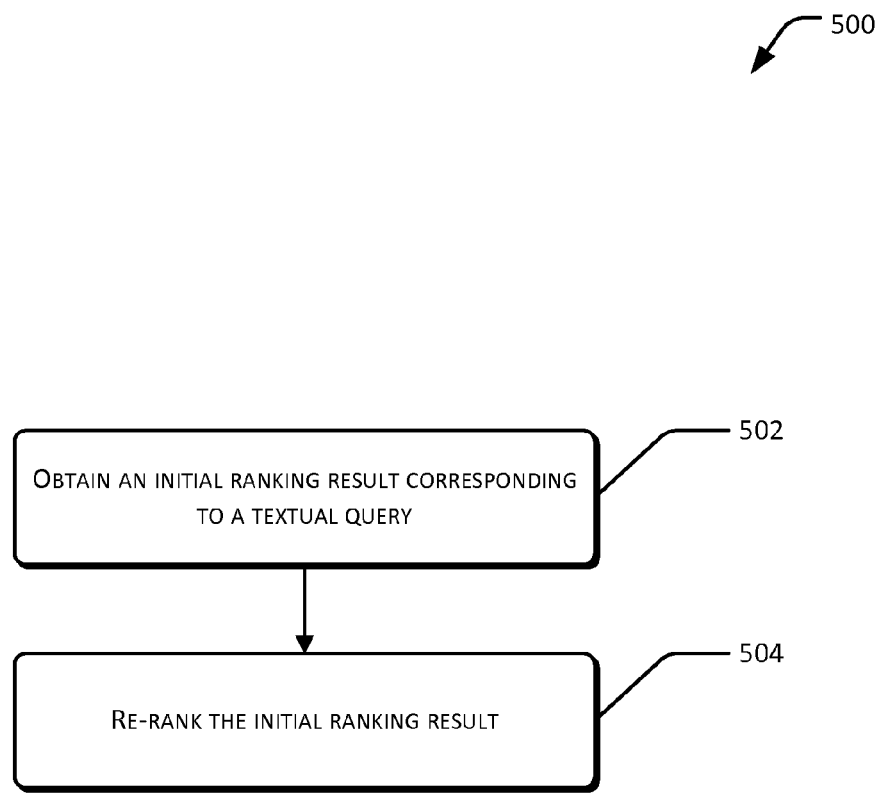
FIG. 5 illustrates a third exemplary method of supervised re-ranking for visual search.

FIG. 5 illustrates a third exemplary method 500 of supervised re-ranking for visual search.

At block 502, the supervised re-ranking system 106 may obtain an initial ranking result corresponding to a textual query. In one embodiment, the textual query may be received from a client such as the user 102 who wants to perform a text-based image search. In another embodiment, the textual query may be created from within the supervised re-ranking system 106 for developing a query-independent re-ranking model using the textual query. In one embodiment, the initial ranking result may include a plurality of images returned in response to the textual query.

At block 504, the supervised re-ranking system 106 may re-rank the initial ranking result based at least upon initial rankings of the plurality of images in the initial ranking result, a neighborhood structure of the plurality of images and pseudo relevance feedback of a predetermined number of top-ranked images in the initial ranking result.

Any of the acts of any of the methods described herein may be implemented at least partially by a processor or other electronic device based on instructions stored on one or more computer-readable media.

CONCLUSION

Although the invention has been described in language specific to structural features and/or methodological acts, it is to be understood that the invention is not necessarily limited to the specific features or acts described. Rather, the specific features and acts are disclosed as exemplary forms of implementing the invention.

What is claimed is:

1. A computer-implemented method comprising:
under control of one or more processors configured with executable instructions:
receiving a textual query;
obtaining an initial ranking result corresponding to the textual query, the initial ranking result including a plurality of images corresponding to the textual query;
representing the textual query using a visual context of the plurality of images, the visual context facilitating determining the visual re-ranking features including prior re-ranking features, contextual re-ranking features and pseudo relevance feedback features;
training, using a supervised training algorithm, a query-independent re-ranking model including a weighted linear combination of features based at least upon the visual re-ranking features of the plurality of images of the textual query to obtain a plurality of weights associated with the features of the weighted linear combination.

2. The computer-implemented method as recited in claim 1, wherein representing the textual query further comprises representing the textual query using features that are independent of any text.

3. The computer-implemented method as recited in claim 1, wherein the prior re-ranking features comprise initial rankings of the plurality of images adjusted by a factor for correcting non-linearity of confidence relevance degradation of the plurality of images in the initial ranking result.

4. The computer-implemented method as recited in claim 1, wherein the contextual re-ranking features comprise information of one or more neighbors and one or more reciprocal neighbors of the plurality of images.

5. The computer-implemented method as recited in claim 1, wherein the pseudo relevance feedback features are computed based at least upon a predetermined number of top images of the plurality of images in the initial ranking result.

6. The computer-implemented method as recited in claim 1, further comprising:
receiving a textual query from a client;
obtaining a first ranking result in response to receiving the textual query from the client, the first ranking result including multiple images;
computing multiple scores corresponding to the multiple images based at least upon the query-independent model re-ranking and the first ranking result;
re-ranking the first ranking result based at least upon the multiple scores.

7. The computer-implemented method as recited in claim 6, further comprising presenting the re-ranked ranking result to the client to be displayed on a device of the client.

8. A computer-implemented method comprising:
under control of one or more processors configured with executable instructions:
receiving a textual query from a client;
obtaining an initial ranking result related to the textual query, the initial ranking result including a plurality of images;
representing the textual query in terms of a visual context of at least a subset of the plurality of images;
re-ranking the initial ranking result based at least upon visual re-ranking features of the at least subset of the plurality of images and a query-independent re-ranking model, the visual re-ranking features being determined from the visual context, and the query-independent re-ranking model being trained according to a supervised algorithm using visual re-ranking features of a plurality of labeled images corresponding to one or more training textual queries.

9. The computer-implemented method as recited in claim 8, wherein the visual re-ranking features of the at least subset of the plurality of images comprise prior re-ranking features, contextual re-ranking features and/or pseudo relevance feedback features of the at least subset of the plurality of images.

10. The computer-implemented method as recited in claim 8, wherein the query-independent re-ranking model includes a weighted linear combination of re-ranking features of the plurality of labeled images, the re-ranking features being independent of any textual features and/or features depending on textual information associated with the plurality of labeled images.

11. The computer-implemented method as recited in claim 8, wherein the query-independent re-ranking model includes a weighted linear combination of re-ranking features of the plurality of labeled images, the re-ranking features including prior re-ranking features, contextual re-ranking features and/or pseudo relevance feedback features of the plurality of labeled images, and wherein the method further comprises computing scores for the at least subset of the plurality of images based upon the weighted linear combination of the query-independent re-ranking model.

12. The computer-implemented method as recited in claim 11, wherein re-ranking the initial ranking result is further based upon the scores for the at least subset of the plurality of images.

13. The computer-implemented method as recited in claim 8, wherein re-ranking the initial ranking result is further based on textual re-ranking features, the textual re-ranking features including textual information in the textual query, textual information associated with the at least subset of the plurality of images and/or textual features extracted from the at least subset of the plurality of images.

14. The computer-implemented method as recited in claim 8, wherein the visual re-ranking features comprises prior re-ranking features including initial rankings of the at least subset of the plurality of images.

15. The computer-implemented method as recited in claim 14, wherein the prior re-ranking features further comprises a factor to correct non-linearity of relevance confidence degradation of the at least subset of the plurality of images in the initial rankings.

16. The computer-implemented method as recited in claim 8, wherein the visual re-ranking features comprises contextual re-ranking features including respective information of a neighborhood structure of each image of the at least subset of the plurality of images.

17. The computer-implemented method as recited in claim 16, wherein respective information of the neighborhood structure of each image of the at least subset of the plurality of images comprises information of one or more neighbors and one or more reciprocal neighbors of each image.

18. The computer-implemented method as recited in claim 8, wherein the visual re-ranking features comprise pseudo relevance feedback re-ranking features computed based at least upon a predetermined number of top images in the initial ranking result.

19. One or more computer-readable media storing computer-executable instructions that, when executed by one or more processors, cause the one or more processors to perform acts comprising:
under control of one or more processors configured with executable instructions:
obtaining an initial ranking result corresponding to a textual query, the initial ranking result including a plurality of images corresponding to the textual query; and
re-ranking the initial ranking result based at least upon initial rankings of the plurality of images in the initial ranking result, a neighborhood structure of the plurality of images and pseudo relevance feedback of a predetermined number of top-ranked images in the initial ranking result.

20. The one or more computer-readable media as recited in claim 19, wherein re-ranking the initial ranking result is further based upon a query-independent re-ranking model that is trained using a plurality of textual queries and a plurality of initial ranking results corresponding to the plurality of textual queries according to a supervised training algorithm.

* * * * *